UNITED STATES PATENT OFFICE.

OSCAR GÜNTHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

RED AZO DYE.

No. 839,382.  Specification of Letters Patent.  Patented Dec. 25, 1906.

Application filed August 14, 1906. Serial No. 330,591.

*To all whom it may concern:*

Be it known that I, OSCAR GÜNTHER, doctor of philosophy, chemist, a citizen of the German Empire, residing at Elberfeld, Kingdom of Prussia, Germany, have invented new and useful Improvements in New Azo Dyes, of which the following is a specification.

This invention relates to the preparation of new tetrazo dyestuffs by the combination of one molecule of the tetrazo compound of para-diaminoparadiphenylethylene ether of the formula:

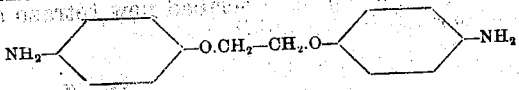

with two molecules of an azo-dyestuff component, of which at least one is the 2-amino-5-naphthol-7-sulfonic acid or a substituted derivative thereof.

The new disazo dyestuffs possess good affinity for the vegetable fiber. They dye unmordanted cotton bright red shades fast to acids.

The process for the production of these dyestuffs consists in combining one molecule of tetrazotized para-diaminoparadiphenylethylene ether of the above-given formula either with two molecules of 2-amino-5-naphthol-7-sulfonic acid or substituted derivatives thereof, or with one molecule of one of the before-mentioned compounds and one molecule of another of the before-mentioned compounds, or with one molecule of one of these compounds and one molecule of any other suitable component, or vice versa.

The new dyestuffs correspond to the general formula:

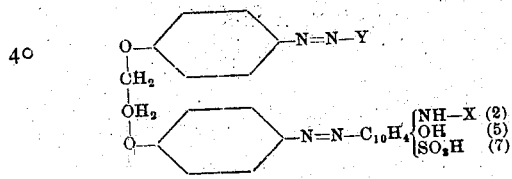

wherein Y stands for an azo-dyestuff component, such as a naphthol sulfonic acid, aminonaphthol sulfonic acid, acidylaminonaphthol sulfonic acid, or the like. X stands for hydrogen, alkyl, acidyl, or aryl, such as acetyl,—$CH_2COOH$, benzoyl, phenyl, tolyl, or the like. They are in the shape of their alkaline salts dark powders soluble in water with a red color, dyeing unmordanted cotton red shades, and yielding upon reduction with stannous chlorid and hydrochloric acid para-diaminoparadiphenylethylene ether.

The invention is illustrated by the following examples, the parts being by weight:

Example I: 24.4 parts of para-diaminoparadiphenylethylene ether are diazotized in the usual manner by means of 13.8 parts of sodium nitrite and the necessary quantity of hydrochloric acid. The resulting tetrazo compound is then introduced into a well-cooled solution of 47.8 parts of 2-amino-5-naphthol-7-sulfonic acid, to which solution sufficient sodium carbonate has been added to maintain the mixture alkaline even after the whole of the tetrazo compound has been added. When the reaction is complete, the mixture is warmed and the dyestuff which has separated out is filtered off and dried. It dyes unmordanted cotton brilliant red shades fast to acids. The dye can be diazotized on the fiber and further combined with amines or phenols. It produces, for instance, when combined with beta-naphthol brilliant violet shades. It is after being dried and pulverized a dark powder having a metallic luster soluble in water with a red, and in concentrated sulfuric acid with a violet, color and yielding upon reduction with stannous chlorid and hydrochloric acid para-diaminodiphenylethylene ether and diamino-5-naphthol-7-sulfonic acid. The process is carried out in an analogous manner on replacing the 2-amino-5-naphthol-7-sulfonic acid with the substituted derivatives of this acid— such as 2-phenylamino-5-naphthol-7-sulfonic acid, 2-acetylamino-5-naphthol-7-sulfonic acid, the glycin of this acid, or the like.

Example II: 24.4 parts of para-diaminoparadiphenylethylene ether are diazotized in the usual manner by means of 13.8 parts of sodium nitrite, and 23.9 parts of 2-amino-5-naphthol-7-sulfonic acid dissolved in an excess of sodium carbonate are added to the well-cooled tetrazo compound. When the formation of the intermediate compound is complete, a solution of 39.2 parts of the sodium salt of 1-ethoxy-8-naphthol-3-6-disulfonic acid is added and the mixture is stirred until the formation of the disazo dyestuff is complete. The solution is heated to 60° centigrade, and the dyestuff is precipitated by the addition of common salt, filtered off, and dried. It dyes unmordanted cotton scarlet-red shades.

The 1-ethoxy-8-naphthol-3-6-disulfonic acid can be replaced by the 2-amino-5-naphthol-1-7-disulfonic acid, or by substitution derivatives of this acid or of the 2-amino-5-naphthol-7-sulfonic acid, or by any other component suitable for the preparation of azo dyestuffs.

| Dyestuff from para-diaminoparadiphenyl-ethylene ether + | Dyes unmordanted cotton— |
|---|---|
| 1. 2 mol. of 2.5-aminonaphthol-7-sulfonic acid. | red |
| 2. 1 mol. of 2.5-aminonaphthol-7-sulfonic acid (acid solution) + 1 mol. of 2.5-aminonaphthol-7-sulfonic acid (alkaline solution) | red |
| 3. 2 mol. of the glycin of 2.5-aminonaphthol-7-sulfonic acid | red |
| 4. 1 mol. of 1-naphthol-4-sulfonic acid + 1 mol. of 2.5-aminonaphthol-7-sulfonic acid | yellowish red |
| 5. 1 mol. of 1-naphthol-3.6-disulfonic acid + 1 mol. of 2.5-aminonaphthol-7-sulfonic acid | bluish red |
| 6. 1 mol. of 1-naphthol-3.8-disulfonic acid + 1 mol. of 2.5-aminonaphthol-7-sulfonic acid | bluish red |
| 7. 1 mol. of 2-naphthol-6-sulfonic acid + 1 mol. of 2.5-aminonaphthol-7-sulfonic acid | yellowish red |
| 8. 1 mol. of 2-naphthol-3.6-disulfonic acid + 1 mol. 2.5-aminonaphthol-7-sulfonic acid | red |
| 9. 1 mol. of 2-phenylamino-5-naphthol-7-sulfonic acid + 1 mol. of 2.5-aminonaphthol-7-sulfonic acid | bluish red |
| 10. 1 mol. of 2.5-aminonaphthol-7-sulfonic acid + 1 mol. of 1.8-dioxynaphthalene-3-6-disulfonic acid | claret-red |
| 11. 1 mol. of 2.5-aminonaphthol-7-sulfonic acid + 1 mol. of 1-ethoxy-8-naphthol-3.6-disulfonic acid | scarlet |
| 12. 1 mol. of 2.5-aminonaphthol-7-sulfonic acid + 1 mol. of 2.5-dioxynaphthalene-7-sulfonic acid | red |
| 13. 1 mol. of 2.5-aminonaphthol-7-sulfonic acid + 1 mol. of 1.8-aminonaphthol-4-sulfonic acid | claret-red |
| 14. 1 mol. of 2.5-aminonaphthol-7-sulfonic acid + 1 mol. of 2-acetylamino-5-naphthol-7-sulfonic acid | red |
| 15. 1 mol. of 2.5-aminonaphthol-7-sulfonic acid + 1 mol. of the glycin of 2.5-aminonaphthol-7-sulfonic acid | red |
| 16. 1 mol. of 2.5-aminonaphthol-7-sulfonic acid + 1 mol. of 2.5-aminonaphthol-1.7-disulfonic acid | yellowish red |
| 17. 1 mol. of 2.5-aminonaphthol-7-sulfonic acid + 1 mol. of 2-acetylamino-5-naphthol-1.7-disulfonic acid | yellowish red |
| 18. 1 mol. of 2.5-aminonaphthol-7-sulfonic acid + 1 mol. of 5.5-dioxy-2.2-dinaphthyl-amin-7.7-disulfonic acid | claret-red |
| 19. 1 mol. of 2-phenylamino-5-naphthol-7-sulfonic acid + 1 mol. of the glycin of 2.5-aminonaphthol-7-sulfonic acid | bluish red |
| 20. 1 mol. of 2-phenylamino-5-naphthol-7-sulfonic acid + 1 mol. of 2.5-aminonaphthol-1.7-disulfonic acid | red |
| 21. 1 mol. of 2-phenylamino-5-naphthol-7-sulfonic acid + 1 mol. of 2-acetylamino-5-naphthol-1.7-disulfonic acid | red |

Having now described my invention and in what manner the same is to be performed, what I claim as new, and desire to secure by Letters Patent, is—

1. The herein-described new tetrazo dyestuffs of the general formula:

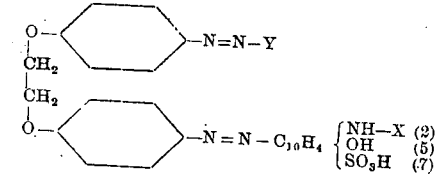

wherein Y stands for an azo-dyestuff component, X for hydrogen, aryl, alkyl, acidyl, which in the shape of their alkaline salts are dark powders soluble in water with a red color; dyeing unmordanted cotton red shades; and yielding upon reduction with stannous chlorid and hydrochloric acid para-diaminoparadiphenylethylene ether, substantially as hereinbefore described.

2. The herein-described new tetrazo dyestuff of the formula:

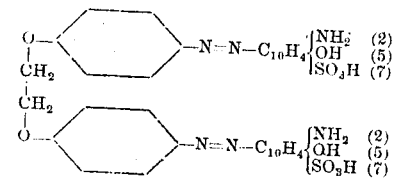

which in the shape of its sodium salt is a dark powder having a metallic luster soluble in water with a red and in concentrated sulfuric acid with a violet color; dyeing unmordanted cotton scarlet-red shades; and yielding upon reduction with stannous chlorid and hydrochloric acid para-diaminoparadiphenylethylene ether and diamino-5-naphthol-7-sulfonic acid, substantially as hereinbefore described.

In testimony whereof I have hereunto set my hand in the presence of two subscribing witnesses.

OSCAR GÜNTHER. [L. S.]

Witnesses:
  OTTO KÖNIG,
  J. A. RITTERSHAUS.